(12) United States Patent
Birchenough

(10) Patent No.: US 7,042,199 B1
(45) Date of Patent: May 9, 2006

(54) SERIES CONNECTED BUCK-BOOST REGULATOR

(75) Inventor: Arthur G. Birchenough, Brook Park, OH (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 234 days.

(21) Appl. No.: 10/629,875

(22) Filed: Jul. 28, 2003

(51) Int. Cl.
*G05F 1/40* (2006.01)
*H02M 7/5387* (2006.01)

(52) U.S. Cl. ........................ 323/271; 363/132

(58) Field of Classification Search ........... 323/266, 323/268, 270, 271, 273, 275, 279, 282, 285; 363/17, 98, 132

See application file for complete search history.

(56) References Cited

U.S. PATENT DOCUMENTS

| | | | |
|---|---|---|---|
| 3,582,765 A | 6/1971 | McCabe | |
| 4,578,630 A * | 3/1986 | Grosch | 323/271 |
| 4,709,323 A | 11/1987 | Lien | |
| 5,208,740 A | 5/1993 | Ehsani | |
| 5,307,004 A | 4/1994 | Carsten | |
| 5,559,684 A | 9/1996 | Ohms et al. | |
| 5,623,398 A | 4/1997 | Beach et al. | |
| 5,949,224 A | 9/1999 | Barkaro | |
| 5,994,882 A * | 11/1999 | Ma | 323/222 |
| 5,998,977 A * | 12/1999 | Hsu et al. | 323/272 |
| 6,275,016 B1 | 8/2001 | Ivanov | |
| 6,348,781 B1 | 2/2002 | Midya et al. | |
| 6,469,476 B1 | 10/2002 | Barrett et al. | |

* cited by examiner

*Primary Examiner*—Matthew V. Nguyen
(74) *Attorney, Agent, or Firm*—Pearne & Gordon LLP (57) ABSTRACT

A Series Connected Buck-Boost Regulator (SCBBR) that switches only a fraction of the input power, resulting in relatively high efficiencies. The SCBBR has multiple operating modes including a buck, a boost, and a current limiting mode, so that an output voltage of the SCBBR ranges from below the source voltage to above the source voltage.

11 Claims, 5 Drawing Sheets

FIG. 9

SERIES CONNECTED BUCK-BOOST REGULATOR

ORIGIN OF THE INVENTION

The invention described herein was made by an employee of the United States Government and may be manufactured and used by or for the Government for Government purposes without the payment of any royalties thereon or therefor.

This application relates generally to DC-to-DC converters/regulators. More specifically, this application relates to a Series Connected Buck-Boost Regulator (SCBBR) that only switches a fraction of the input power, with the regulator having multiple operating modes including a buck, a boost, and a current limiting mode.

BACKGROUND OF THE INVENTION

Improvements in the efficiency and size of DC—DC converters and/or regulators have resulted from advances in components, primarily semiconductors, and improved topologies. To a lesser extent, improvements in passive components, topologies, and soft switching schemes have also provided benefits. This is even true for linear regulators, where higher temperature components have reduced size and weight, and lower dropout voltage semiconductors and drive techniques have reduced the power loss.

One topology which has shown very high potential in limited applications is the Series Connected Boost Unit (SCBU), wherein a small DC—DC converter output is connected in series with the input bus to provide an output voltage equal to, or greater than, the input voltage. Because only a fraction of the power throughput is switched by the DC—DC converter, the overall system efficiency is very high. But this technique is limited to applications where it is sufficient that the output voltage is never less than the input voltage.

In the typical boost mode, the low voltage output of a small DC—DC converter is connected in series with the input voltage. The output voltage can then be adjusted from essentially equal to the input voltage up to the input voltage plus the maximum output voltage of the DC—DC converter. For example, a regulator for a 100 volt 1 kw bus could be constructed with a DC—DC converter having a 100 volt nominal input, and a 0 to 10 volt output and a 100 watt, 10 amp, rating. The configuration would allow regulating the output to up to 10% higher than the input, and yet only use switching and filtering components sized for 10% of the total rating, and it therefore offers greatly reduced size and power loss. The technique is very useful in situations where the input/output voltage ratio is relatively small, the output is always greater than the input, and isolation between the input and output is not required.

The change from linear to switching regulators was revolutionary, and the power loss and therefore size of regulators made a large step decrease. Since then the single most significant parameter determining converter efficiency and size, for a given frequency, has been the kva rating. The size of components to switch, transform, and filter is relatively independent of the topology, as the same amount of power is switched, rectified, and stored in filter components. The technique of partial power processing, wherein only a small fraction of the total output power is required to buck or boost the input to the desired output voltage, can significantly reduce the converter size and power loss.

For applications where output voltages equal to, or lower than, an input voltage are desirable, a buck converter is appropriate. However, it is desirable to have a converter design which provides a wide range of output voltages, both greater than, and lesser than, the input voltage. Further, high efficiency would be quite beneficial in such a design. The resulting buck-boost converter would thereby be quite useful in a wide variety of applications, including orbital or interplanetary applications.

SUMMARY OF THE INVENTION

Provided is a series connected buck-boost regulator comprising: a control circuit; a switching circuit for connecting to a source voltage; and an output circuit connected to the switching circuit and for outputting a load voltage. The control circuit controls the output circuit and the input circuit for operating the regulator in a plurality modes including: a current limiting (CL) mode; a buck mode; and a boost mode. Further, only a fraction of an output power of the regulator is switched by the switching circuit during one or both of the buck and the boost modes.

Further provided is a series connected buck-boost regulator which has a control circuit and a transformer having a primary winding and a center-tapped secondary winding, wherein the center tap of the secondary winding is for connecting to a source voltage.

The regulator also has a switching circuit controlled by the control circuit and for pulse-width-modulating the source voltage for inputting into the primary winding, with the switching circuit including four PWM switches connected in a bridge configuration with the primary winding connected to a center of the bridge. Each PWM switch has a diode connected in parallel.

The regulator also has an output circuit controlled by the control circuit and connected to the secondary winding for outputting a load voltage, with the output circuit having two pairs of two series connected output switches connected in parallel. Again, each output switch also has a diode connected in parallel.

Still further provided is the above regulator also having a first transformer diode connected to a terminal of the secondary winding; a second transformer diode connected to another terminal of the secondary winding; and a transformer shorting switch connected to the center tap of the secondary and also connected to the first and the second transformer diodes for shorting the secondary on command from the control circuit.

Even further provided is the above regulator, wherein the PWM switches include a first switch, a second switch, a third switch, and a fourth switch, and further wherein the output switches include a fifth switch, a sixth switch, a seventh switch, and an eighth switch.

During the boost mode, the control circuit of the above regulator is operated to continuously turn on the fifth switch and the sixth switch, and continuously turn off the transformer shorting switch.

Also during the boost mode, the control circuit of the regulator cycles through a plurality of boost states including: a first boost state wherein the first, fourth, and seventh switches are on and further wherein the second, third, and eighth switches are off; a second boost state wherein the seventh and eighth switches are on, and further wherein the first, second, third, and fourth switches are off; and a third boost state wherein the second, third and eighth switches are on and further wherein the first, fourth, and seventh switches are off.

During the buck mode, the control circuit of the regulator continuously turns on the seventh switch and the eighth switch, and continuously turns off the transformer shorting switch.

Also during the buck mode, the control circuit cycles through a plurality of buck states including: a first buck state wherein the first, fourth, and sixth switches are on and further wherein the second, third, and fifth switches are off; a second buck state wherein the fifth and sixth switches are on, and further wherein the first, second, third, and fourth switches are off; and a third buck state wherein the second, third, and fifth switches are on, and further wherein the first, fourth, and sixth switches are off.

During the current limiting mode, the control circuit of the regulator continuously turns off the first, second, third, and fourth switches, and continuously turns on the transformer shorting switch.

Also during the current limiting mode, the control circuit cycles through a plurality of CL states including: a first CL state wherein the fifth, sixth, seventh, and eighth switches are on; and a second CL state wherein the fifth, sixth, seventh, and eighth switches are off.

And further provided is the above regulator further comprising: a freewheeling diode connected between the output circuit and a ground; and an inductor for connecting the output circuit to a load.

Further, the control circuit of the above regulator can also control a duty cycle of the pulse-width-modulation of the source voltage and also drives the output circuit such that the output voltage can be varied in a range from a minimum voltage less than the source voltage to a maximum voltage greater than the source voltage.

Still further, the above regulator can also have some substantial fraction of the power input by the source voltage not be pulse-width-modulated by the switching circuit during one or both of the modes.

DETAILED DESCRIPTION OF THE PREFERRED EMBODIMENTS

The Series Connected Buck-Boost Regulator (SCBBR) concept extends partial power processing technique used in the SCBU to applications where the desired output voltage can be higher and/or lower than the input voltage. The implementation described herein can operate as a conventional buck converter to operate at very low output to input voltage ratios, and it can also operate as a boost converter to boost the output voltage above the input voltage. This disclosure describes the operation and performance of an example SCBBR configured as a bus voltage regulator providing ±50% voltage regulation range, bus switching, and overload limiting, operating at up to, or even over, 98% efficiency.

The series connected buck-boost technique expands the array of applications considerably by also allowing the output to be lower than the input. This allows essentially twice the regulation range for a given size converter as compared to either a buck or a boost converter, standing alone. A circuit enhancement allows operation of the same converter in a more conventional buck mode, so that the output can be regulated down to zero volts, if desired, allowing operation as a current limiting voltage regulation remote power controller (RPC). The only major restriction on the use of this device is that it does not typically offer input/output isolation in its normal application.

Note that in the description and accompanying figures, only the primary components of the various embodiments of the SCBBR circuit are listed and/or shown. Peripheral components (such as filters, power supplies, and biasing circuits, for example) are not shown, but are well known in the art.

Figure 1:
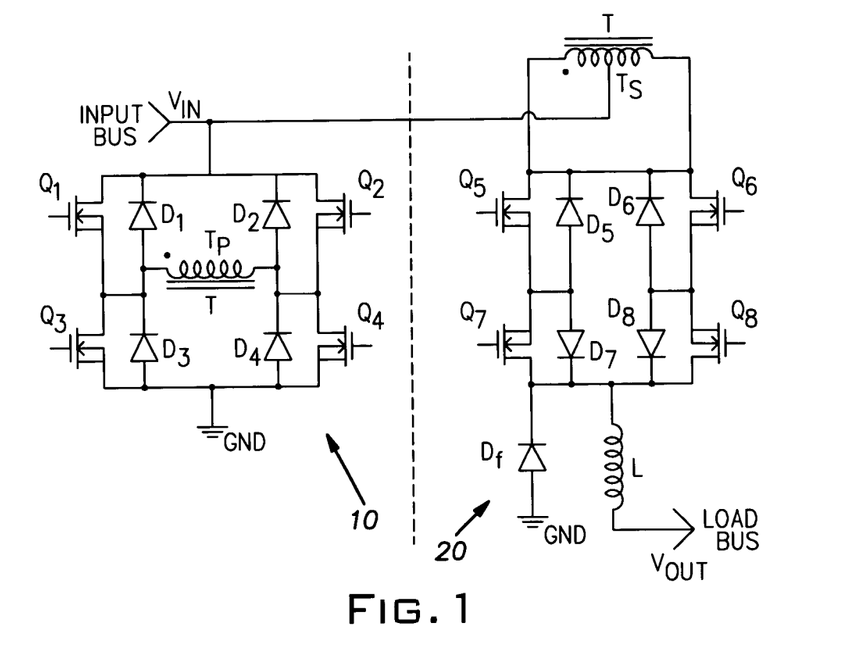
FIG. 1 is a schematic diagram of one embodiment of the invention.

FIG. 1 is a schematic showing the primary components of the SCBBR circuit. The switching circuit 10 includes four switches, $Q_1$–$Q_4$. Four diodes $D_1$–$D_4$ are also utilized in the switching circuit 10 as shown in FIG. 1 such that each switch $Q_n$ has a diode $D_n$ in parallel (where "n" ranges from 1–4). The switching circuit 10 connects to a primary $T_p$ of a transformer T, as also shown in FIG. 1. The source voltage $V_{in}$ is also connected to the switching circuit 10 as shown in the figure.

The switching circuit 10 is used to pulse-width-modulate (PWM) the input voltage $V_{in}$ for input into the primary winding $T_p$ of the transformer T. This PWM function of the switching circuit 10 is controlled by a control circuit 30 (discussed below and shown in FIG. 8) which controls, among other things, the action of the switches $Q_n$. The control circuit 30 further controls a duty cycle of the PWM (i.e., the length of time the switches stay on/off). In this way, the input voltage $V_{in}$ is converted into a PWM voltage input into the primary $T_p$ for conversion by the transformer T into a secondary voltage in the secondary winding $T_s$. (note that, under some operating modes—e.g., the buck mode discussed below—the primary $T_p$ acts as a secondary, whereas the secondary winding Ts acts as a primary).

An output circuit 20 is also shown in FIG. 1. A secondary voltage is generated in the secondary winding $T_s$ of the transformer T by the PWM of $V_{in}$ by the input circuit 10. This secondary voltage is input into the output circuit 20 by the connections as shown in the figure. The input voltage $V_{in}$ is also input into a center tap of the secondary winding $T_s$ of the transformer T, thus allowing some input power to bypass the switching circuit 10, and thereby increasing the overall efficiency of the SCBBR.

The output circuit 20 has four switches, $Q_5$–$Q_8$. Four diodes $D_5$–$D_8$ are also utilized in the output circuit 20 as shown in FIG. 1 such that each switch $Q_m$ has a diode Dm in parallel (where "m" ranges from 5–8). The switches $Q_m$ of the output circuit are also controlled by the control circuit 30 (as discussed below). A freewheeling diode $D_f$, which typically operates as an uncontrolled switch, and an inductor L are also used in the output circuit 20 as shown in the figure. In this manner the output circuit outputs a load voltage $V_{in}$.

Figure 2:
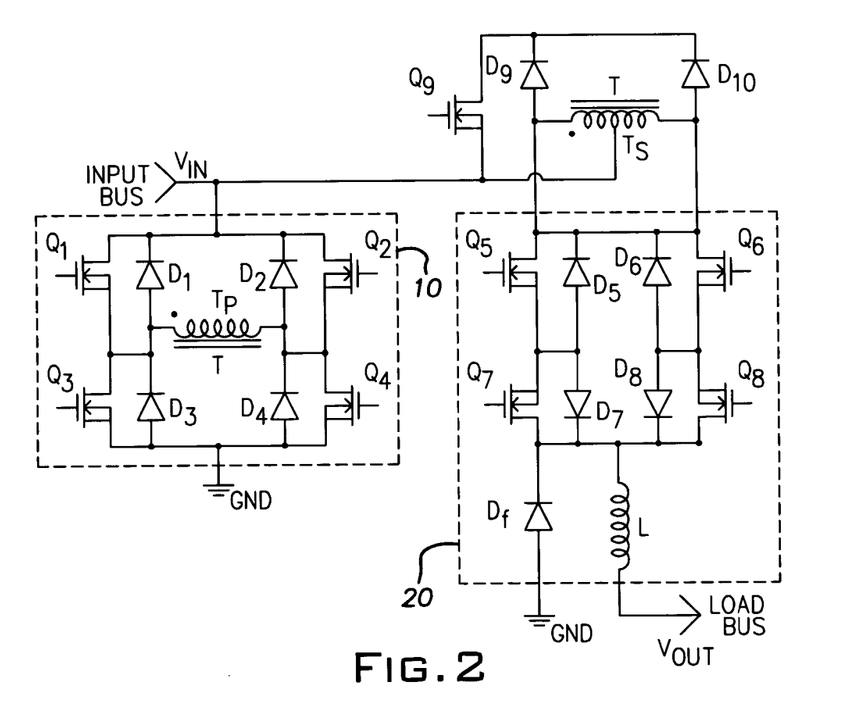
FIG. 2 is a schematic diagram of another embodiment of the invention.

FIG. 2 shows the circuit of FIG. 1 with additional components to provide additional functionality to the SCBBR. Switch $Q_9$ and diodes $D_9$ and $D_{10}$ are added as shown in the figure to enable the current limiting mode described in more detail below. The switch $Q_9$ will also typically be controlled by the control circuit 30.

Preferably, all of the switches will be implemented using semiconductor switches, such as FETs, for example. Other semiconductor switches may also be used, as the application requires. High efficiency and low power consumption of the switches are desirable characteristics. Other types of switches having low power consumption and high efficiency traits that can operate at the desired switching cycle can also be used.

Figure 3:
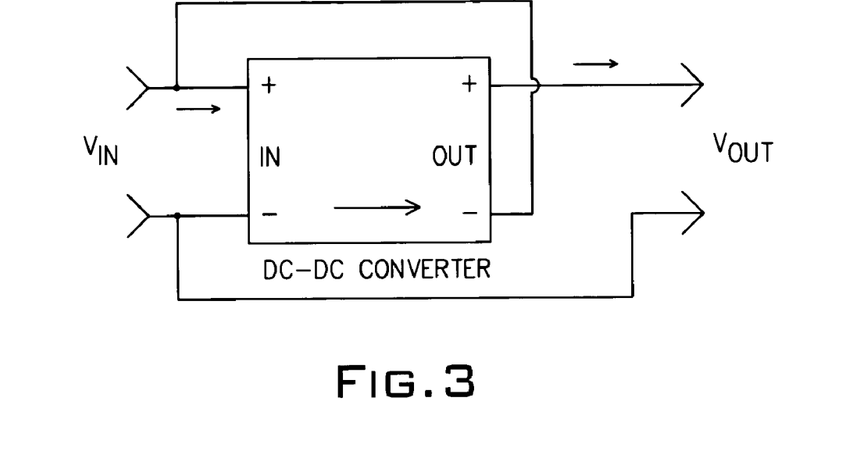
FIG. 3 is a block diagram showing the boost mode concept applied to a DC-to-DC converter.

The operation of the circuit is described best by separating the modes of operation and describing them individually, hereinbelow:

A diagram of the power flow in the boost mode is shown in the block diagram of FIG. 3. In the boost mode, the output of a low voltage converter is added in series with the input voltage to provide an output voltage equal to or greater than the input. Thus, power from the converter is added to the output to increase the voltage.

Figure 4:
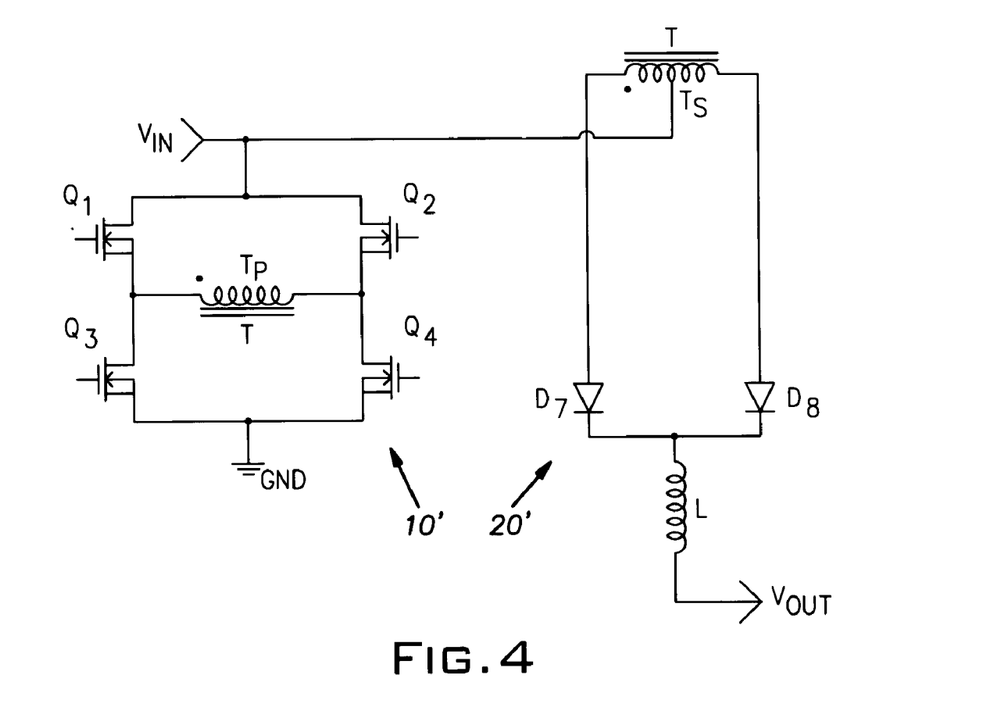
FIG. 4 is an effective schematic showing the implementation of the boost mode concept of FIG. 3.

The SCBBR boost implementation described as an example uses a full-bridge input stage and a center tapped transformer-rectifier output stage as shown in the effective schematic of FIG. 4 (which does not show the switches and/or diodes that are always conducting and/or always off). When all the primary side switches $Q_1$–$Q_4$ are turned off there is no voltage across the primary $T_p$ of the transformer T, and the input voltage $V_{in}$ is connected to the output through an input filter, the secondary of the transformer, the rectifier diodes, and an output filter.

When the switches of the input bridge are conducting, a voltage is impressed on the secondary $T_s$ of the transformer T. The instantaneous output at the rectifiers $D_7$ & $D_8$ is the input voltage $V_{in}$ plus the transformer secondary voltage, which is equal to the input voltage divided by the transformer turns ratio. By varying the PWM duty cycle from 0 to 100% the average output $V_{out}$ can be controlled between a minimum of the input voltage, and a maximum of the input voltage plus the boost provided by the transformer's secondary output. The output filter smoothes the output and the average output voltage, ignoring conduction losses in the filters and rectifiers, will be:

$$V_{out}=V_{in}+V_{in}*(PWM \text{ Duty Cycle})/(\text{Turns Ratio})$$

The turns ratio for the prototype design was chosen to be 2:1, allowing the output to be boosted up to 150% of the input. However, any practical turns ration (and/or duty cycle) can be chosen, as desired.

The buck mode of the SCBBR operates in a very different mode, but uses essentially the same components as the boost mode. The power flow of the buck mode is as shown in the block diagram of FIG. 5. The input voltage is greater than the desired output voltage. The concept of operation is that the input of a DC—DC converter is connected in series, with opposed polarity to the SCBBR input bus, and the output of the DC—DC converter is connected in parallel with the SCBBR input bus.

Figure 5:
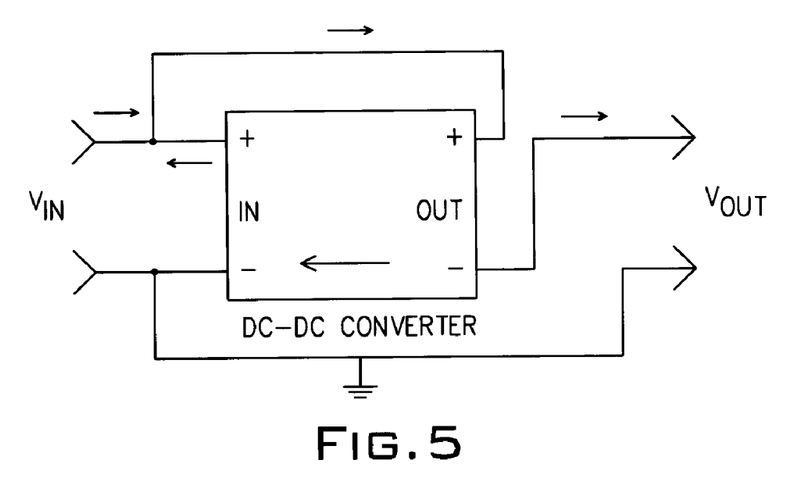
FIG. 5 is a block diagram showing the boost mode concept applied to a DC-to-DC converter.

The voltage drop across the input of the DC—DC converter reduces the SCBBR output voltage, and the power associated with this voltage drop is returned to the input bus by the DC—DC converter. The operation is similar to placing a battery in series with the input bus, in one direction (similar to as shown by FIG. 3) it increases (boosts) the output voltage. When it is connected "backwards" (similar to as shown by FIG. 5) it decreases (bucks) the output voltage. In the boost case, the battery would be discharged as would be expected, but in the buck case the battery would be charged (and eventually overcharged). The use of a DC—DC converter allows a continuous process.

Note that the SCBBR, the input and output voltages are always positive and that the SCBBR input and output currents are always positive. However, in terms of the DC—DC converter within the SCBBR, the voltage on the input bus side is always positive and the current in the output bus side is always positive, but the current into the input bus side of the DC—DC converter itself is positive in the boost mode and negative in the buck mode, and the voltage at the output bus side of the DC—DC converter itself will be positive for the boost mode and negative for the buck mode.

Figure 6:
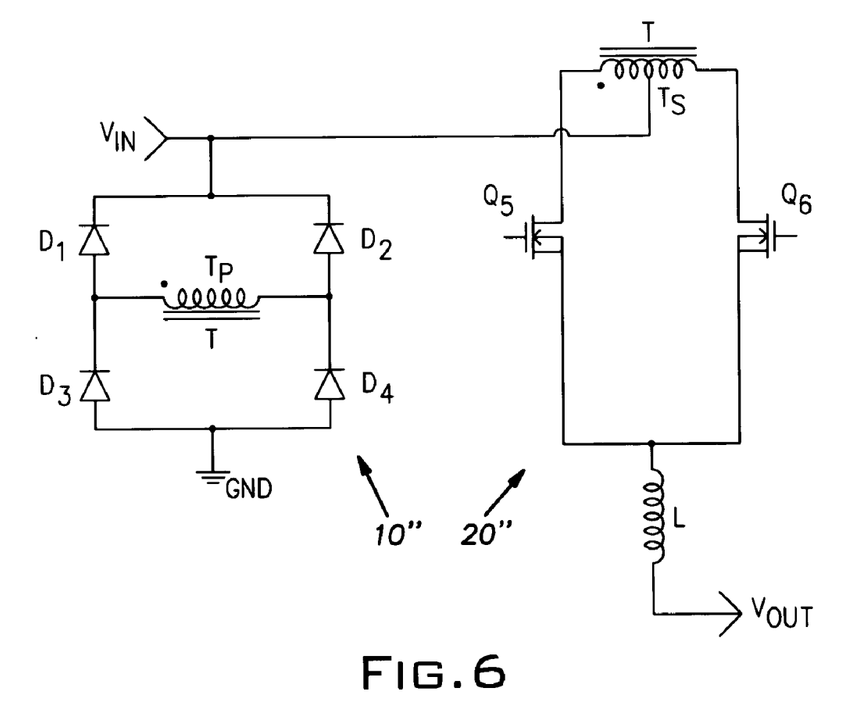
FIG. 6 is an effective schematic showing the implementation of the buck mode concept of FIG. 5.

The effective schematic for buck mode operation is shown in FIG. 6 (which does not show the switches and/or diodes that are always conducting and/or always off). Many of the same components used for the boost converter are used for the buck converter, although in different roles. The center-tapped side of the transformer $T_s$, which was the secondary in the boost mode acts as a primary (whereas the primary $T_p$ acts as a secondary in this mode). The rectifier diodes of the boost converter are replaced by switches. (In the actual application the buck mode switches are placed in series with the boost mode rectifiers, as shown in FIGS. 1 and 2.) The switches, which switched the primary of the transformer in the boost mode, now function as a full-wave bridge rectifier using the body diodes (or synchronous rectification with the switches).

If the transformer voltage was less than 1:1, a negative output voltage could be generated, and the net power flow in the SCBBR would be back to the input, although that is not contemplated as a primary use of the device. The SCBBR can also operate in a mode where the power flow is from the output to the input if synchronous rectification is used at all points, and it makes some sense for use as a "regenerative" sort of application. This ability will be discussed below.

Continuing the discussion of the buck mode shown in FIGS. 5 & 6, the output voltage of the DC—DC converter is recirculated back to the input bus of the SCBBR. Varying the duty cycle of the switches controls the ratio between the input and output voltage of the converter. Since the input bus voltage fixes the output voltage of the DC—DC converter, the effect of varying the duty cycle is to vary the voltage drop between the input bus and the SCBBR output voltage.

The switching action of the two switches in the buck converter of FIG. 6 might also be considered unusual in that they are controlled such that either one or both switches are always turned on, they are both never off simultaneously, even during the switching cycle. It is a current fed mode of operation. When both switches are conducting there is no voltage drop (except the small conduction losses) across the input of the DC—DC converter, so the output voltage of the SCBBR is equal to its input voltage. When one switch is open, the voltage across the transformer output will be equal to the SCBBR input bus voltage since it is clamped to that value by the bridge rectifiers. Therefore the input voltage across the converter will be equal to the input bus voltage divided by the transformer turns ratio. Varying the duty cycle controls the average voltage dropped across the DC—DC converter, and therefore the SCBBR output voltage.

The SCBBR output voltage in the buck mode can be computed as:

$$V_{out} = V_{in} - V_{in} * (PWM \text{ Duty Cycle})/(\text{Turns Ratio})$$

Where a PWM Angle of 0 has the switches closed all the time and an angle of 100% corresponds to each switch being closed 50% of the time. Except for the sign in the equation, this equation is identical to the one for the boost mode. By redefining the duty cycle for maximum buck to be −100%, the equations become identical, and for a 2:1 turns ratio transformer, the output can be varied from 50% to 150% of the input voltage.

Figure 7:
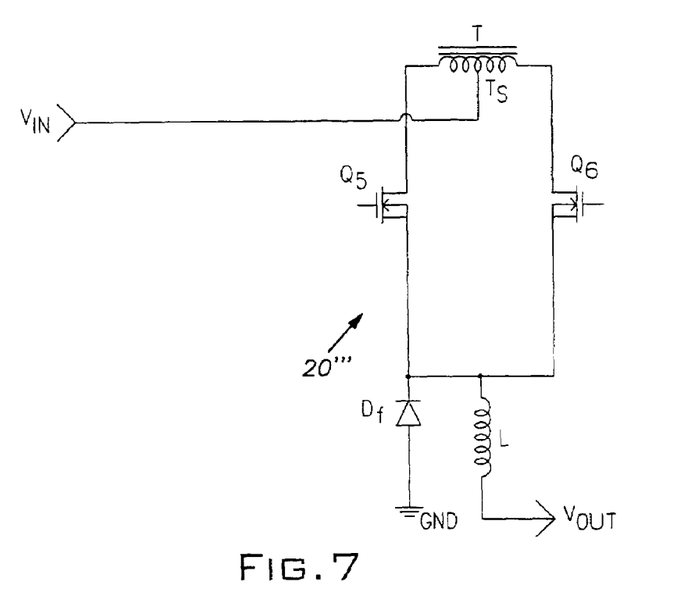
FIG. 7 is an effective schematic showing the implementation of the current limiting mode concept.

The third mode of operation, the Current Limiting (CL) mode, an effective schematic of which is shown in FIG. 7, uses many of the components used in the boost and buck modes, as well as some additional components. It uses a completely different mode of switching, and allows operation down to 0 output voltage to allow an increased operating range, and particularly an OFF mode and turn-on/overload limiting function. In the CL mode the primary or full wave bridge side of the converter switches serve no purpose, and they are all tuned off. The switches $Q_5$–$Q_8$, also used for the buck mode on the output bus side of the converter, are switched simultaneously, with $Q_5/Q_7$ and $Q_6/Q_8$ each effectively acting as one switch and the transformer has no voltage across it. A diode is added between the FET switches and common, and the FET switches, the diode, and the output inductor function as a conventional buck converter as shown in FIG. 7. The transformer has no function in this mode, and in fact is shorted by an auxiliary switch ($Q_9$ in FIG. 2) to reduce voltage transients.

In this CL mode, the output voltage can be computed as:

$$V_{out} = V_{in} * (PWM \text{ Angle})$$

Although the form of this equation is quite different from the boost and buck mode equations given previously, the output voltage is still defined only by the input voltage and PWM angle, and the output can be controlled between 0 volts and the input voltage. Actually, the range in this mode overlaps the range in the SCBBR buck mode, but with typically lower efficiency and higher ripple currents in the filters. In the prototype, the switching frequency is increased for operation in the CL mode to reduce the current ripple. The current limit mode is typically useful only during turn on and overload conditions, or if the output voltage must be lower than that that can be obtained with the SCBBR operating in buck mode. Also, the equation is only valid for continuous conduction where the inductor L current never goes to 0.

Essentially, overlaying the boost, buck, and current limit mode effective schematics reveals the complete SCBBR schematic, as previously discussed and shown in FIG. 2.

This discussion has heretofore assumed that the input and output currents of the SCBBR are always positive. However, if synchronous rectification is used on both sides of the DC—DC converter, then current flow can be in either direction. This can be very useful because the magnetizing current of the transformer can be supplied from the input source, otherwise there would be a minimum output current (that required to magnetize the transformer) below which the SCBBR buck mode would not operate. Switches that can conduct in both directions are already desireable on two of the switches on the SCBBR output. The logic to control the primary switches is straightforward (and discussed below), and provides the magnetizing current discussed above. By also using active switches in the other two positions, the output the efficiency will increase (synchronous rectification), and the SCBBR can operate in a regenerative mode wherein power is actually returned to the source from the load. The regenerative operation in the CL mode is possible if the free wheeling diode $D_f$ is replaced with a switch.

Finally, various output filter designs can be utilized for smoothing the output voltage for load protection and/or regulation. In addition, input filters can be added to the device, if necessary, to smooth the input voltage as well.

Figure 8:
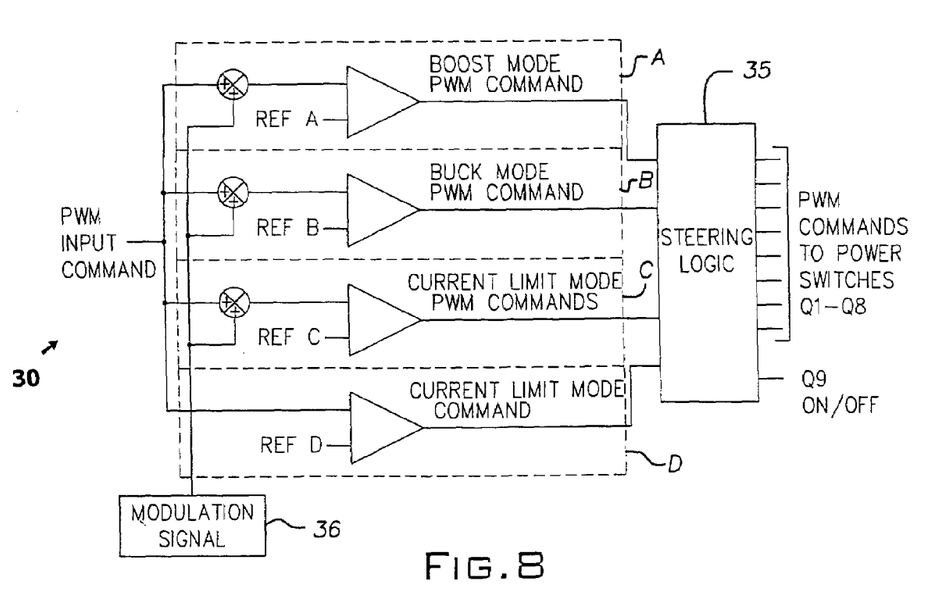
FIG. 8 is a schematic diagram showing the control circuit of still another embodiment of the invention.

The control circuitry, an example of which is shown in the schematic of FIG. 8, can consist of 3 Pulse Width Modulators A, B, & C, one for each mode, and a mode switching circuit D to switch between either the Current Limit or the Buck and Boost Modes. Steering logic 35 is included to supply the proper PWM pulses to the appropriate power switches $Q_1$–$Q_8$. The steering logic circuit could utilize digital logic to connect the PWM signals and the mode command from the comparators (in the pulse width modulators) to the appropriate switches as defined in the logic table (given below). A single analog PWM input command is input to the circuit. The PWM command can be generated from voltage and current regulating circuitry (not shown) used to control the voltage ration between the input bus and the output bus. Typically, Ref A>Ref B>Ref C>Ref D. The control for switch $Q_9$ is not shown in the diagram, but can be similarly implemented.

The highest PWM command signals produce boost mode PWM commands to the switches. Intermediate level commands produce Buck mode PWM signals. Normally, the circuit operates in either the boost or buck mode, but for input to output voltage ratios of nearly 1, the circuits may operate in both modes simultaneously.

The steering logic is set up so that the PWM switching commands in these two modes intersperse with each other without interference. Thus there can be either a slight overlap in control range wherein both modes co-exist, zero overlap (ideal) or a slight underlap wherein for a small command range neither boost nor buck mode PWM commands are generated, without significantly affecting the circuits' performance. A lower level PWM command input is used to generate PWM commands for the Current Limit mode. An additional circuit in the logic decides when the commands are low enough to use the Current Limit mode instead of the buck mode, and switches logic to prevent buck mode PWM commands and enable current limit mode PWM commands.

The switch to the current limit mode also turns on a power switch which effectively shorts the power transformer to reduce voltage spikes on the power switches during the current limit mode. The mode switching between the current limit mode and the buck and boost modes incorporates hysteresis to eliminate any indecision as to which operating mode to use caused by noise near the transition point.

The switching sequence goes through four states in the boost and buck modes, and 2 states in the current limiting mode, as shown in the following table:

| MODE/STATE | $Q_1$, $Q_4$ | $Q_2$, $Q_3$ | $Q_5$ | $Q_6$ | $Q_7$ | $Q_8$ | $Q_9$ |
|---|---|---|---|---|---|---|---|
| Boost Mode State A: | ON | OFF | ON | ON | ON | OFF | OFF |
| Boost Mode State B: | OFF | OFF | ON | ON | ON | ON | OFF |
| Boost Mode State C: | OFF | ON | ON | ON | OFF | ON | OFF |
| Boost Mode State D: | OFF | OFF | ON | ON | ON | ON | OFF |
| Buck Mode State A: | ON | OFF | OFF | ON | ON | ON | OFF |
| Buck Mode State B: | OFF | OFF | ON | ON | ON | ON | OFF |

-continued

| MODE/STATE | $Q_1$, $Q_4$ | $Q_2$, $Q_3$ | $Q_5$ | $Q_6$ | $Q_7$ | $Q_8$ | $Q_9$ |
|---|---|---|---|---|---|---|---|
| Buck Mode State C: | OFF | ON | ON | OFF | ON | ON | OFF |
| Buck Mode State D: | OFF | OFF | ON | ON | ON | ON | OFF |
| CL Mode State A: | OFF | OFF | ON | ON | ON | ON | ON |
| CL Mode State B: | OFF | OFF | OFF | OFF | OFF | OFF | ON |

States A and C in the boost and buck modes range from 0 to 50% duty cycle, and at the boost and buck modes can be running simultaneously as long as the total duty cycle of both modes is less than 50%. In the current limit mode, the duty cycle of either state can be 0 to 100%. Depending on the control logic employed, the buck modes and the CL modes can be executing simultaneously, if desired, or the control system can switched discretely between these modes.

Prototype Regulator

High efficiency is possible using the SCBBR technique if the circuit is optimized for low losses. As such, the design can use rather large semiconductors and magnetic components, and a relatively low switching frequency. Smaller components can be used where a small, compact size is desired (although efficiency may suffer).

A current development of the SCBBR is for an application as a fuel cell regulator. The prototype SCBBR is being tested with a simulated fuel cell scaled at 50% of the voltage and 10% of the current rating of the intended fuel cell. The target fuel cell is rated at 10 kw, 340 volts no load (170 for the simulator), 200 volts full load (100 volts for the simulator), at 50 amps (5 maps for the simulator). The intended load is a 270-volt (135 volts for the simulated system) bus. The efficiency of the prototype doesn't fall greatly until about 10% load. The power loss is a relatively constant 2 to 3 watts below 50% power. These efficiencies are for the power stage only, the control power requirement, including gate drive, of the prototype is 3 to 4 watts.

The DC resistance of the series connected components of the prototype (the input filter, the transformer secondary, the secondary switches, and the output filter) is 0.15 ohms, accounting for 0.25% loss at 2 amps, and 0.6% loss at 5 amps load. Two-thirds of the loss at full load is due to switching losses or resistive losses in the primary and magnetic components core losses.

Voltage regulation in a converter is primarily a measure of the performance of the voltage regulation feedback loop. The regulation can be as good as the regulator, independent of the transfer characteristics of the converter. However, the preceding discussion discussed the transfer functions of this converter and the similarity of them throughout the three different modes, and implied that the output voltage could be determined based on the input voltage, the transformer ratio, and the PWM angle. Open loop regulation generally continues into the current limit mode also, but not as accurately. A closed loop regulator is also included on the prototype SCBBR. Its only function is to trim out the remaining output errors, so its control range can be limited to altering the output voltage only a few percent, and it can use only the integral of the voltage error. Transient response, and damping, can be provided by the open loop path, which simplifies the design of the integral controller path.

Figure 9:
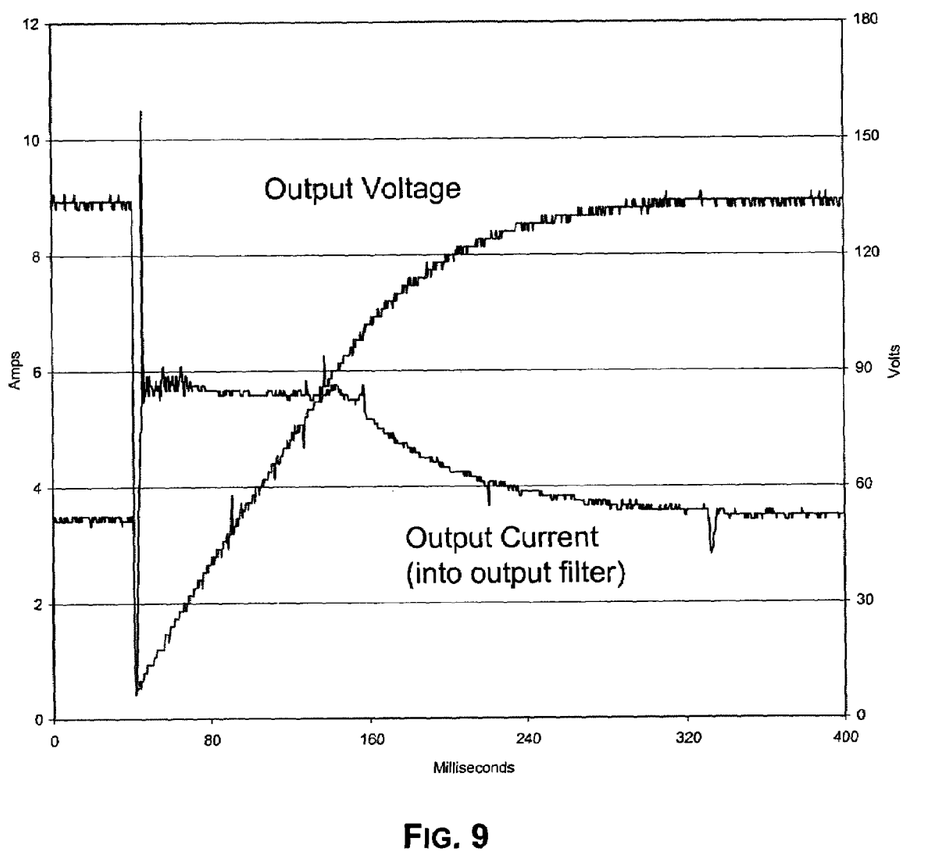
FIG. 9 is a graphical plot of the output voltage and current curves of a prototype implementation of the invention using closed loop regulation.

As discussed so far, the SCBBR is typically a stiff voltage source, and to be useful in a real system the ability to limit currents into an overload is desired. Two circuits can be added to accomplish this. The first an instantaneous overcurrent sense at twice rated current to shut off all switches and limit the peak current into the output filter. The second is a linear proportional pus integral current regulation loop at 1.5 times rated current to control the PWM angle until the output voltage recovers and the voltage regulator takes over. Implementation of these loops was successful as illustrated in FIG. 9, which shows the prototype recovery from applying a large capacitor as a transient load while running at rated current. The capacitor is 100 times the output filter capacitance so the output voltage collapses almost completely. The instantaneous overcurrent sensing limits the initial spike of current (into the filter), and then the SCBBR runs under current limit until the capacitor is charged. The current sensing and the data plotted are the current into the output filter. This is the same as the currents that is in the output switches, and it is the critical current to be controlled for protection of the SCBBR.

The invention has been described hereinabove using specific examples; however, it will be understood by those skilled in the art that various alternatives may be used and equivalents may be substituted for elements or steps described herein, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to Cover all embodiments, literal or equivalent, covered thereby.

What is claimed is:

1. A series connected buck-boost regulator comprising:
   a control circuit;
   a switching circuit for connecting to a source voltage;
   an output circuit connected to said switching circuit and for outputting a load voltage, wherein
   said control circuit controls said output circuit and said input circuit for operating said regulator in a plurality of modes including:
      a current limiting (CL) mode;
      a buck mode; and
      a boost mode,
   wherein only a fraction of an output power of said regulator is switched by said switching circuit during one or both of the buck and the boost modes; and
   a transformer having a primary winding and a center-tapped secondary winding, wherein the center tap of said secondary winding is for connecting to the source voltage, and wherein said primary winding is connected to said switching circuit, and further wherein said secondary winding is connected to said output circuit.

2. A series connected buck-boost regulator comprising:
   a control circuit;
   a switching circuit for connecting to a source voltage;
   an output circuit connected to said switching circuit and for outputting a load voltage, wherein
   said control circuit controls said output circuit and said input circuit for operating said regulator in a plurality of modes including:
      a current limiting (CL) mode;
      a buck mode; and
      a boost mode,
   wherein only a fraction of an output power of said regulator is switched by said switching circuit during one or both of the buck and the boost modes;

and wherein said switching circuit includes a first switch, a second switch, a third switch, and a fourth switch in a bridge configuration, and further wherein said output circuit includes a series connected fifth and sixth switch connected to a series connected seventh and eighth switch.

3. The regulator of claim 2, wherein, during said boost mode, said control circuit continuously turns on said fifth switch and said sixth switch, and further wherein said control circuit cycles through a plurality of boost states including:
  a first boost state wherein the first, fourth, and seventh switches are on and further wherein the second, third, and eighth switches are off;
  a second boost state wherein the seventh and eighth switches are on, and further wherein the first, second, third, and fourth switches are off; and
  a third boost state wherein the second, third and eighth switches are on and further wherein the first, fourth, and seventh switches are off.

4. The regulator of claim 2, wherein, during said buck mode, said control circuit continuously turns on said seventh switch and said eighth switch, and further wherein said control circuit cycles through a plurality of buck states including:
  a first buck state wherein said first, fourth, and sixth switches are on and further wherein said second, third, and fifth switches are off;
  a second buck state wherein said fifth and sixth switches are on, and further wherein said first, second, third, and fourth switches are off; and
  a third buck state wherein said second, third, and fifth switches are on, and further wherein said first, fourth, and sixth switches are off.

5. The regulator of claim 2, wherein, during said current limiting mode, said control circuit continuously turns off said first, second, third, and fourth switches, and further wherein said control circuit cycles through a plurality of CL states including:
  a first CL state wherein said fifth, sixth, seventh, and eighth switches are on; and
  a second CL state wherein said fifth, sixth, seventh, and eighth switches are off.

6. The regulator of claim 2, further comprising a ninth switch connected to said secondary winding which is turned off by said control circuit during said boost and said buck modes, but is turned on during said CURRENT LIMITING mode to short out said secondary winding.

7. The regulator of claim 2, wherein each switch has a diode placed in parallel.

8. The regulator of claim 7, further comprising:
  a ninth switch connected to said center tap of said secondary winding which is turned off by said control circuit during said boost and said buck modes, but is turned on during said CURRENT LIMITING mode to short out said secondary winding;
  a freewheeling diode connected between said output circuit and a ground;
  a first transformer diode connecting a terminal of said secondary to said ninth switch;
  a second transformer diode connecting another terminal of said secondary to said ninth switch; and
  an inductor for connecting said output circuit to a load.

9. The regulator of claim 8, wherein, during said boost mode, said control circuit continuously turns on said fifth switch and said sixth switch, and continuously turns off said ninth switch, and further wherein said control circuit cycles through a plurality of boost states including:
  a first boost state wherein the first, fourth, and seventh switches are on and further wherein the second, third, and eighth switches are off;
  a second boost state wherein the seventh and eighth switches are on, and further wherein the first, second, third, and fourth switches are off; and
  a third boost state wherein the second, third and eighth switches are on and further wherein the first, fourth, and seventh switches are off;
and wherein, during said buck mode, said control circuit continuously turns on said seventh switch and said eighth switch, and continuously turns off said ninth switch, and further wherein said control circuit cycles through a plurality of buck states including:
  a first buck state wherein said first, fourth, and sixth switches are on and further wherein said second, third, and fifth switches are off;
  a second buck state wherein said fifth and sixth switches are on, and further wherein said first, second, third, and fourth switches are off; and
  a third buck state wherein said second, third, and fifth switches are on, and further wherein said first, fourth, and sixth switches are off;
and further wherein, during said CURRENT LIMITING mode, said control circuit continuously turns off said first, second, third, and fourth switches, and continuously turns on said ninth switch, and further wherein said control circuit cycles through a plurality of CL states including:
  a first CL state wherein said fifth, sixth, seventh, and eighth switches are on; and
  a second CL state wherein said fifth, sixth, seventh, and eighth switches are off.

10. A series connected buck-boost regulator comprising:
  a control circuit;
  a switching circuit for connecting to a source voltage;
  an output circuit connected to said switching circuit and for outputting a load voltage, wherein
  said control circuit controls said output circuit and said input circuit for operating said regulator in a plurality of modes including:
    a current limiting (CL) mode:
    a buck mode; and
    a boost mode,
    wherein only a fraction of an output power of said regulator is switched by said switching circuit during one or both of the buck and the boost modes;
  and
  a transformer having a primary winding and a center-tapped secondary winding, with the center tap for connecting to the source voltage, wherein
  said switching circuit includes a first switch, a second switch, a third switch, and a fourth switch in a bridge configuration, said primary winding of said transformer connected to a center of said bridge, and further wherein
  said output circuit includes a series connected fifth and sixth switch connected to a terminal of said secondary winding and connected to a series connected seventh and eighth switch connected to another terminal of said secondary winding, and also wherein
  a ninth switch is included in said regulator for shorting out said transformer secondary winding on command from said control circuit.

11. The regulator of claim 10, wherein, during said boost mode, said control circuit continuously turns on said fifth switch and said sixth switch, and continuously turns off said ninth switch, and further wherein said control circuit cycles through a plurality of boost states including:
- a first boost state wherein the first, fourth, and seventh switches are on and further wherein the second, third, and eighth switches are off;
- a second boost state wherein the seventh and eighth switches are on, and further wherein the first, second, third, and fourth switches are off; and
- a third boost state wherein the second, third and eighth switches are on and further wherein the first, fourth, and seventh switches are off;

and wherein, during said buck mode, said control circuit continuously turns on said seventh switch and said eighth switch, and continuously turns off said ninth switch, and further wherein said control circuit cycles through a plurality of buck states including:
- a first buck state wherein said first, fourth, and sixth switches are on and further wherein said second, third, and fifth switches are off;
- a second buck state wherein said fifth and sixth switches are on, and further wherein said first, second, third, and fourth switches are off; and
- a third buck state wherein said second, third, and fifth switches are on, and further wherein said first, fourth, and sixth switches are off;

and further wherein, during said CURRENT LIMITING mode, said control circuit continuously turns off said first, second, third, and fourth switches, and continuously turns on said ninth switch, and further wherein said control circuit cycles through a plurality of CL states including:
- a first CL state wherein said fifth, sixth, seventh, and eighth switches are on; and
- a second CL state wherein said fifth, sixth, seventh, and eighth switches are off.

* * * * *

UNITED STATES PATENT AND TRADEMARK OFFICE
CERTIFICATE OF CORRECTION

| | | |
|---|---|---|
| PATENT NO. | : 7,042,199 B1 | |
| APPLICATION NO. | : 10/629875 | |
| DATED | : May 9, 2006 | |
| INVENTOR(S) | : Arthur G. Birchenough | |

It is certified that error appears in the above-identified patent and that said Letters Patent is hereby corrected as shown below:

In the claims, CLM 10, COL. 12, LN 45, please delete ":" (colon) and insert therefor -- ; -- (semicolon).

Signed and Sealed this

Twenty-second Day of August, 2006

JON W. DUDAS
*Director of the United States Patent and Trademark Office*